(12) United States Patent
Guen et al.

(10) Patent No.: US 8,703,326 B2
(45) Date of Patent: Apr. 22, 2014

(54) RECHARGEABLE BATTERY AND METHOD FOR MANUFACTURING THE SAME

(75) Inventors: Min-Hyung Guen, Yongin-si (KR);
Hyun-Soo Lee, Yongin-si (KR);
Yong-Chul Seo, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 162 days.

(21) Appl. No.: 13/317,649

(22) Filed: Oct. 25, 2011

(65) Prior Publication Data

US 2012/0328932 A1    Dec. 27, 2012

(30) Foreign Application Priority Data

Jun. 22, 2011    (KR) .................. 10-2011-0060884

(51) Int. Cl.
*H01M 2/06*    (2006.01)
*B29C 45/14*    (2006.01)

(52) U.S. Cl.
USPC .......... 429/161; 429/180; 429/181; 29/623.2; 264/272.21

(58) Field of Classification Search
USPC ........ 429/161, 180, 181; 264/272.11, 272.21; 29/623.2
See application file for complete search history.

(56) References Cited

U.S. PATENT DOCUMENTS

| | | | |
|---|---|---|---|
| 7,029,790 B2 * | 4/2006 | Mizuno et al. ................ 429/161 |
| 7,666,547 B2 * | 2/2010 | Urano et al. .................. 429/161 |
| 8,263,255 B2 * | 9/2012 | Byun et al. ............... 429/181 X |
| 2003/0134193 A1 | 7/2003 | Hanafusa et al. |
| 2010/0227205 A1 | 9/2010 | Byun et al. |
| 2010/0227212 A1 | 9/2010 | Kim |
| 2010/0233528 A1 | 9/2010 | Kim et al. |
| 2012/0171525 A1 * | 7/2012 | Guen ........................ 429/181 X |

FOREIGN PATENT DOCUMENTS

| | | |
|---|---|---|
| JP | 10-154490 A | 9/1998 |
| JP | 2007-134233 A | 5/2007 |
| JP | 201123235 A | 2/2011 |
| KR | 10-2003-0060814 A | 7/2003 |
| KR | 10-2010-0099596 A | 9/2010 |
| KR | 10-2010-0099983 A | 9/2010 |
| KR | 10-2010-0102462 A | 9/2010 |

OTHER PUBLICATIONS

KR Notice of Allowance dated Apr. 4, 2013.

* cited by examiner

*Primary Examiner* — Stephen J. Kalafut
(74) *Attorney, Agent, or Firm* — Lee & Morse, P.C.

(57) ABSTRACT

A rechargeable battery includes an electrode assembly having electrodes on opposite sides of a separator, a case retaining the electrode assembly, a cap plate coupled with an opening of the case, electrode terminals extending through terminal holes of the cap plate, lead tabs connecting the electrode terminals to the electrode assembly, the electrode terminals being electrically connected to the lead tabs at connection parts, and insulators, the connection parts being embedded in the insulators.

16 Claims, 7 Drawing Sheets

RECHARGEABLE BATTERY AND METHOD FOR MANUFACTURING THE SAME

BACKGROUND

1. Field

The described technology relates generally to a rechargeable battery and a method for manufacturing the same

2. Description of the Related Art

A rechargeable battery can be repeatedly charged and discharged, unlike a primary battery. A low-capacity rechargeable battery may be used for a small portable electronic device such as a mobile phone, a laptop computer, and a camcorder. A large-capacity rechargeable battery may be used as a power supply for driving a motor of a hybrid vehicle and the like.

For example, a rechargeable battery includes an electrode assembly provided with electrodes on both surfaces of a separator, a case receiving the electrode assembly, a cap plate coupled with an opening of the case, and electrode terminals installed on the cap plate and connected to the electrodes through lead tabs.

The electrode terminal, for instance, includes a rivet part disposed in a terminal hole of the cap plate and a terminal plate disposed on an outer surface of the cap plate. The rivet part and the lead tab are electrically connected to each other inside the cap plate. The rivet part and the terminal plate are electrically connected to each other outside the cap plate.

An inner end of the rivet part is made of the same material as the lead tab inside the cap plate and an outer end of the rivet part is made of the same material as the terminal plate outside the cap plate. In other words, the inner and outer ends of the rivet part are formed of different materials at the terminal plate side and the lead tab side, and bonded to the terminal plate and the lead tab.

Accordingly, the number of processes for fabricating and assembling the electrode terminal increases, which causes an increase in a fabrication cost of the electrode terminal. For instance, when the lead tab connected to a negative electrode and the terminal plate are respectively made of copper (Cu) and aluminum (Al), the rivet part has the inner end made of copper (Cu) and the outer end made of aluminum (Al).

The outer end made of aluminum of the rivet part connected to the negative electrode may be contacted with an electrolytic solution inside the rechargeable battery due to a sealing defect in the terminal hole of the cap plate. In this case, the outer end of the rivet part may be melted due to an electrochemical reaction in the negative electrode.

The above information disclosed in this Background section is only for enhancement of understanding of the background of the described technology and therefore it may contain information that does not form the prior art that is already known in this country to a person of ordinary skill in the art.

SUMMARY

On or more embodiments may provide a rechargeable battery including: an electrode assembly having electrodes on opposite sides of a separator; a case retaining the electrode assembly; a cap plate coupled with an opening of the case; electrode terminals extending through the terminal holes of the cap plate; lead tabs connecting the electrode terminals to the electrode assembly, the electrode terminals being electrically connected to the lead tabs at connection parts; and insulators, the connection parts being embedded in the insulators. The electrode terminals and the lead tabs may include different materials. The electrode terminal in the connection part may include aluminum and the lead tab in the connection part may include copper.

The electrode terminal may include a rivet part in the terminal hole, a terminal plate connected to an outer portion of the rivet part, the outer portion being outside the case, a flange integrally formed with an inner portion of the rivet part, the inner portion being inside the case, and the lead tab includes a bonding part coupled to the rivet part and the flange, and the rivet part and the bonding part include different materials. Caulk may secure the rivet part and the bonding part together and a weld may secure the flange and the bonding part together.

The rivet part, the flange and the bonding part may connect at the connection part and may be embedded in the insulator. The insulator may include a first opening through which the rivet part of the electrode terminal protrudes and a second opening through which the lead tab protrudes. A gasket may be interposed between the rivet part of the electrode terminal and the terminal hole.

The electrode terminal may include aluminum, the lead tab may include copper, and the insulator may include polyphenylene sulfide.

The insulator may include an embedding part in which the lower end of the rivet part of the electrode terminal, the flange, and the bonding part of the lead tab are embedded, and a sealing part which protrudes from the embedding part, alongside the rivet part and extends through the terminal hole. The case and the cap plate may include the same material.

One or more embodiments may provide a method for manufacturing a rechargeable battery, including: connecting an electrode terminal and a lead tab to each other at a connection part, the electrode terminal and the lead tab including different materials; performing insert injection molding to embed the connection part in an insulator; electrically connecting the electrode terminal to the lead tab in the connection part; and coupling the electrode terminal with a terminal hole of a cap plate.

Connecting the electrode terminal and the lead tab may include caulking a rivet part of the electrode terminal and a bonding part of the lead tab to form the connection part. The performing of insert injection molding may include embedding a lower end of the rivet part of the electrode terminal, a flange, and a bonding part of the lead tab corresponding in position to the lower end of the rivet part and the flange, inside the insulator.

Performing insert injection molding may include forming a first opening in the insulator to allow the rivet part of the electrode terminal to protrude therethrough and a second opening in the insulator to allow the lead tab to protrude therethrough.

Coupling the electrode terminal with the terminal hole may include coupling the electrode terminal protruding from the insulator with the terminal hole and inserting a gasket between the terminal hole and the electrode terminal.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
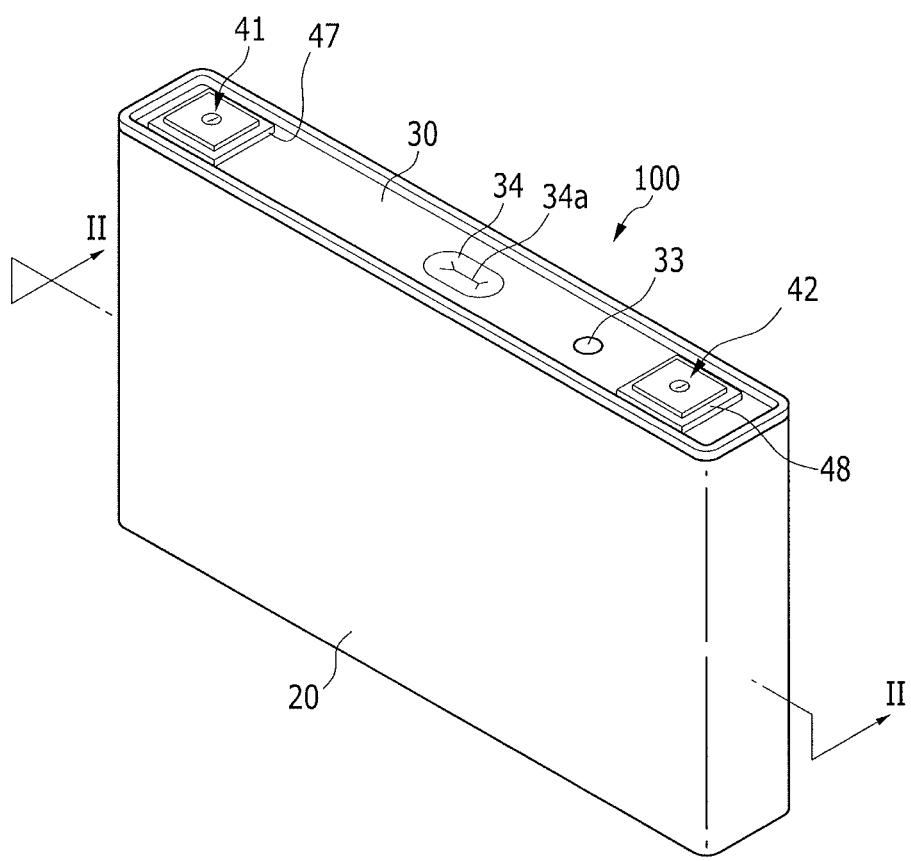
FIG. 1 illustrates a perspective view of a rechargeable battery according to a first exemplary embodiment.

Korean Patent Application No. 10-2011-0060884, filed on Jun. 22, 2011, in the Korean Intellectual Property Office, and entitled: "Rechargeable Battery and Method for Manufacturing the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
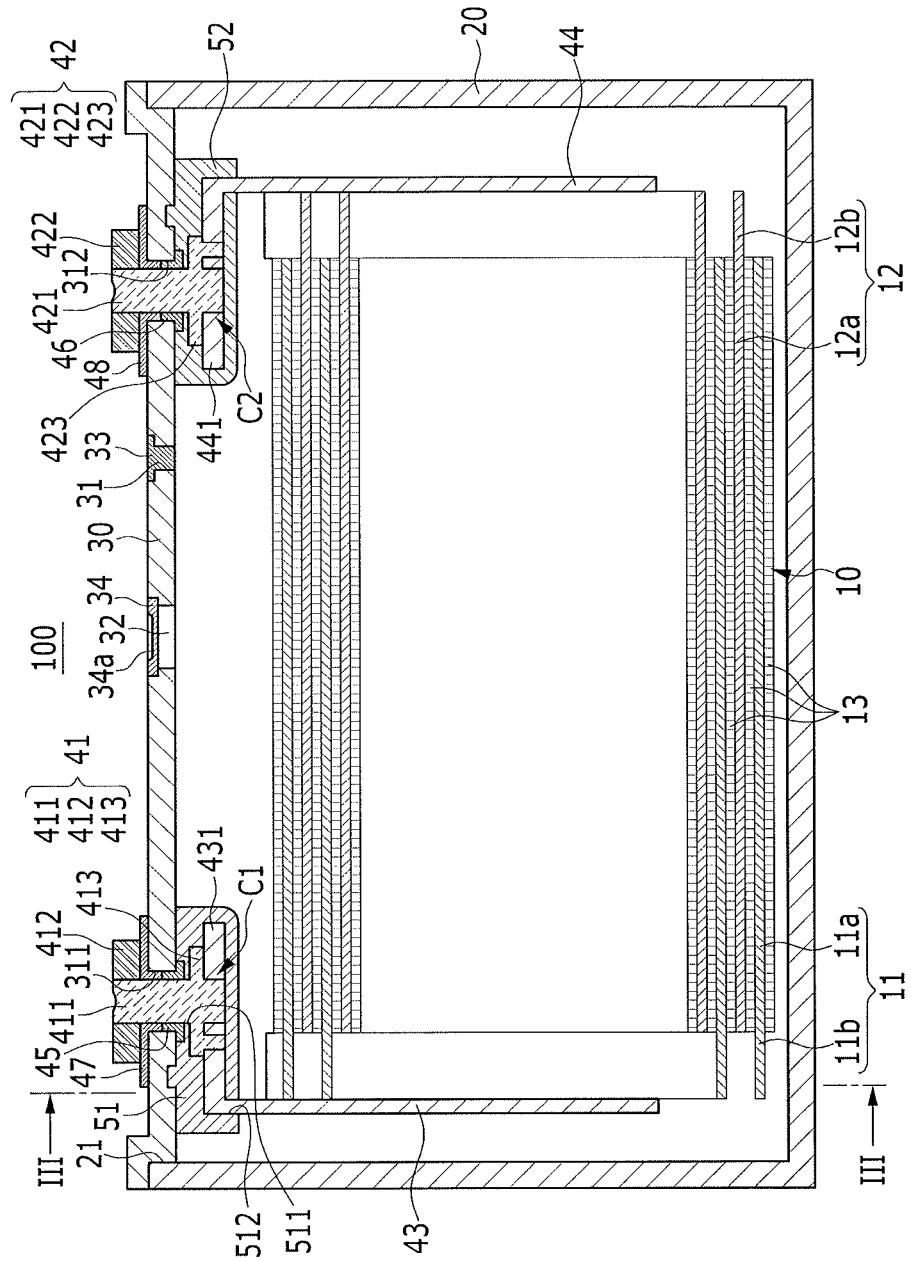
FIG. 2 illustrates a cross-sectional view of the rechargeable battery taken along line II-II of FIG. 1.

FIG. 1 illustrates a perspective view of a rechargeable battery 100 according to a first exemplary embodiment. FIG. 2 illustrates a cross-sectional view taken along line II-II of FIG. 1.

Referring to FIGS. 1 and 2, the rechargeable battery 100 according to the first exemplary embodiment may include an electrode assembly 10 which repeatedly performs charging and discharging, a case 20 receiving the electrode assembly 10 and an electrolytic solution, a cap plate 30 coupled with an opening 21 of the case 20, and electrode terminals 41 and 42, lead tabs 43 and 44, and insulators 51 and 52 which are installed on the cap plate 30.

For instance, the electrode assembly 10 may be formed by disposing electrodes, namely, a negative electrode 11 and a positive electrode 12, on both sides of a separator 13 that is an electric insulator and winding the stacked negative electrode 11, separator 13, and positive electrode 12 in a jelly roll state.

According to some embodiments, the electrode assembly 10 may be assembled by stacking the positive electrode and the negative electrode configured of a single plate, having a separator therebetween. According to some embodiments, the electrode assembly 10 may be assembled by stacking the negative electrode, the separator, and the positive electrode in a zigzag fashion (not shown).

The negative electrode 11 and the positive electrode 12 may each include coated parts 11a and 12a and uncoated parts 11b and 12b. The coated parts 11a and 12a may include portions of current collectors that are coated with an active material. The uncoated parts 11b and 12b may include portions of the current collectors that are exposed, i.e., not coated with the active material. The uncoated parts 11b and 12b may extend from sides of the coated parts 11a and 12a, respectively. According to some embodiments, the current collector of the negative electrode 11 may include a thin copper film and the current collector of the positive electrode 12 may include a thin aluminum film.

The uncoated part 11b of the negative electrode 11 may be disposed at one end of the negative electrode 11, alongside the coated part 11a. The uncoated part 12b of the positive electrode 12 may be disposed at one end of the positive electrode 12, alongside the coated part 12a of the positive electrode 12. The negative electrode 11 and the positive electrode 12 may be wound. The uncoated parts 11b and 12b may each be disposed at opposing ends of the electrode assembly 10 to facilitate electric connection.

The case 20 may include an opening 21 at one side so that the electrode assembly 10 can be inserted through the opening 21. The case 20 may have a rectangular, parallelepiped shape, and may include a space or cavity to receive the electrode assembly 10 and an electrolytic solution.

The cap plate 30 may be coupled with the opening 21 of the case 20 to thereby seal the receiving space of the case 20. According to some embodiments, the case 20 and the cap plate 30 may include the same material, to facilitate welding. For instance, the case 20 and the cap plate 30 may be made of aluminum. As such, when the case 20 and the cap plate 30 are coupled with each other, e.g., welded together, the case 20 and the cap plate 30 may have good weldability.

The cap plate 30 may include an electrolyte inlet 31 and a vent hole 32. The electrolytic solution may be injected into the case 20 through the electrolyte inlet 31 after the cap plate 30 is coupled with the case 20. After the electrolytic solution is injected into the case 20, the electrolyte inlet 31 may be sealed with a sealing closure 33.

The vent hole 32 may be sealed with a vent plate 34 by, e.g., welding. The vent hole 32 may discharge an internal gas, generated by charging and discharging, outside the rechargeable battery 100, and, thereby, prevent the rechargeable battery 100 from exploding.

When the internal pressure of the rechargeable battery 100 reaches a predetermined value, the vent plate 34 may be incised. A notch 34a may be formed on the vent plate 34, which may facilitate the incision of the vent plate 34. When the vent hole 32 is opened by incision of the vent plate 34, the internal gas of the rechargeable battery 100 may be discharged.

The cap plate 30 may include terminal holes 311 and 312 to electrically connect the inside and the outside of the case 20 to each other. The electrode terminals, that is, the negative and positive terminals 41 and 42, may be in the terminal holes 311 and 312 of the cap plate 30 and may be connected to the electrode assembly 10 through lead tabs, e.g., negative and positive electrode lead tabs 43 and 44, respectively.

In an implementation, the negative terminal 41 may be connected to the negative electrode 11 of the electrode assembly 10 through the negative electrode lead tab 43 and the positive terminal 42 may be connected to the positive electrode 12 of the electrode assembly 10 through the positive electrode lead tab 44. The negative electrode lead tab 43 and the positive electrode lead tab 44 may have conductivity.

According to some embodiments, the negative and positive terminals 41 and 42 may each include rivet parts 411 and 421, terminal plates 412 and 422, and flanges 413 and 423. The rivet parts 411 and 421 may be disposed in the terminal holes 311 and 312 of the cap plate 30, and may protrude inside and outside of the cap plate 30. The terminal plates 412 and 422 may be connected to the outer end of the rivet parts 411 and 421 by riveting. The flanges 413 and 423 may extend from an inner end of the rivet parts 411 and 421, and may have a larger diameter than the rivet parts 411 and 421.

The rivet parts 411 and 421 and the terminal plates 412 and 422 may be made of the same material, e.g., aluminum. The terminal plates 412 and 422 may be welded to bus bars (not shown) so as to connect the rechargeable battery 100 to adjacent rechargeable batteries (not shown) in series or in parallel. The rivet parts 411 and 421 and the flanges 413 and 423 may be integrally formed. Therefore, the structure of the negative and positive terminals 41 and 42 may be simplified and the manufacture thereof may also be facilitated.

First and second connection parts C1 and C2 may be formed by electrically connecting the negative and positive terminals 41 and 42 to the negative and positive electrode lead tabs 43 and 44 inside the cap plate 30, e.g., under the cap plate 30. The insulators, e.g., the negative and positive insulators 51 and 52, may each be embedded with the first and second connection parts C1 and C2 inside, e.g., under the cap plate 30. Therefore, the first and second connection parts C1 and C2 may be electrically insulated from the cap plate 30 and the electrolytic solution may not contact the first and second connection parts C1 and C2.

The first and second connection parts C1 and C2 may include lower ends of the rivet parts 411 and 421 that are coupled with the negative and positive electrode lead tabs 43 and 44, the flanges 413 and 423 that are bonded to the negative and positive electrode lead tabs 43 and 44 to support the negative and positive lead tabs 43 and 44, and the bonding parts 431 and 441 of the negative and positive electrode lead tabs 43 and 44 that correspond in position to and are bonded to the rivet parts 411 and 421 and the flanges 413 and 423. For example, the first and second connection parts C1 and C2 may include an intersection of the bonding parts 431 and 441 with the rivet parts 411 and 421, respectively, and the flanges 413 and 423, respectively.

According to some embodiments, the negative electrode lead tab 43 may include the same copper as that included in the uncoated part 11b of the negative electrode 11 and may be connected to the uncoated part 11b, e.g., by welding. The positive electrode lead tab 44 may include the same aluminum as that included in the uncoated part 12b of the positive electrode 12 and may be connected to the uncoated part 12b, e.g., by welding.

The positive electrode lead tab 44 may include the same material, e.g., aluminum as that of the rivet part 421. As such, the bonding part 441 may be inserted into the lower end of the rivet part 421, and may be caulked thereto, and the bonding part 441 may be welded to the flange 423, such that the positive electrode lead tab 44 may be connected to the positive terminal 42.

The negative electrode lead tab 43 may include a material different from that of the rivet part 421. For example, the negative electrode lead tab 43 may include copper and rivet part 411 may include aluminum. As such, the bonding part 431 may be inserted into the lower end of the rivet part 411 and the lower end of the rivet part 411 may be caulked, such that the negative electrode lead tab 43 is connected to the negative terminal 41.

A negative insulator 51 may be embedded with, e.g., have embedded therein, the lower end of the rivet part 411, the flange 413, and the bonding part 431. A positive insulator 52 may be embedded with, e.g., have embedded therein, the lower ends of the rivet part 421, the flange 423, and the bonding part 441.

The negative insulator 51, embedded with the first connection part C1, and the positive insulator 52, embedded with the second connection part C2, may have the same structure. Therefore, the negative insulator 51 will be exemplified below.

Figure 3:
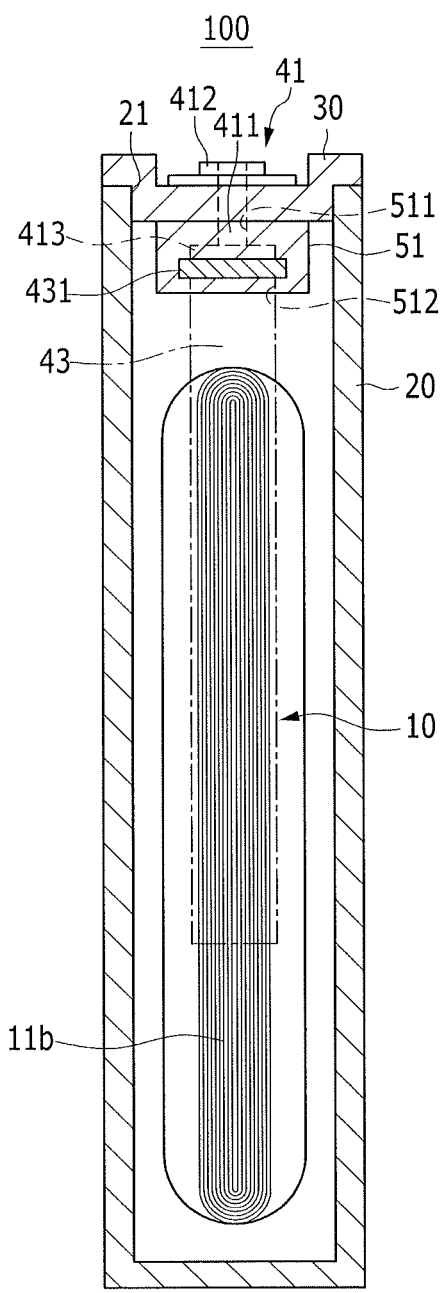
FIG. 3 illustrates a cross-sectional view of the rechargeable battery taken along line III-III of FIG. 2.

FIG. 3 illustrates a cross-sectional view taken along line of FIG. 2.

Referring to FIGS. 2 and 3, the negative insulator 51 may be embedded with the flange 413 of the negative terminal 41, the lower end of the rivet part 411, and the bonding part 431 of the negative electrode lead tab 43 which form the first connection part C1. Accordingly, the first connection part C1 may not contact the electrolytic solution.

For example, the negative insulator 51 may include a first opening 511 through which the rivet part 411 of the negative terminal 41 may protrude inside the terminal hole 311, and a second opening 512 through which the negative electrode lead tab 43 may protrude inside the case 20. The rivet part 411 may seal the first opening 511 and the negative electrode lead tab 43 may seal the second opening 512.

Accordingly, the negative insulator 51 may prevent the negative terminal 41 and the first connection part C1 of the negative electrode lead tab 43 from contacting the electrolytic solution, in spite of an electrochemical reaction at the negative electrode 11.

In an implementation, the negative insulator 51 may include a material of high mechanical strength and heat resistance. For example, the negative insulator 51 may include polyphenylene sulfide (PPS), and may, thereby, have high mechanical strength and heat resistance.

Gaskets 45 and 46 (see FIG. 2) may be interposed between the rivet parts 411 and 421 of the negative and positive terminals 41 and 42 and the terminal holes 311 and 312 on the negative and positive insulators 51 and 52 at the first opening 511 to further seal any open space between the rivet parts 411 and 421 and the terminal holes 311 and 312 and the spaces between the negative and positive insulators 51 and 52 and the cap plates 30.

In addition, outer insulators 47 and 48 (see FIG. 2) may be interposed between the rivet parts 411 and 421 of the negative and positive terminals 41 and 42 and the terminal holes 311 and 312, and may be interposed between the terminal plates 412 and 422 and the outer surface of the cap plate 30. Therefore, the negative and positive terminals 41 and 42 may be electrically insulated from the cap plate 30 and the terminal holes 311 and 312 may be sealed.

Hereinafter, a method for manufacturing the rechargeable battery 100 according to the first exemplary embodiment will be described. A method for manufacturing a rechargeable battery may include connecting the negative and positive terminals 41 and 42 to the negative and positive electrode lead tabs 43 and 44, respectively (as shown in FIG. 4A), performing insert injection molding to embed, inside the negative and positive insulators, the negative and positive terminals 41 and 42, respectively, and the first and second connection parts C1 and C2, respectively, (as shown in FIG. 4B), and connecting the negative and positive terminals 41 and 42 to the terminal holes 311 and 312, respectively (as shown in FIG. 4C).

The negative terminal 41 and the negative electrode lead tab 43 may include different materials. The positive terminal 42 and the positive electrode lead tab 44 may include the same material. A method of connecting the negative terminal 41 to the negative electrode lead tab 43 through the first connection part C1 and embedding the first connection part C1 inside the negative insulator 51 is exemplified below.

Figure 4A:
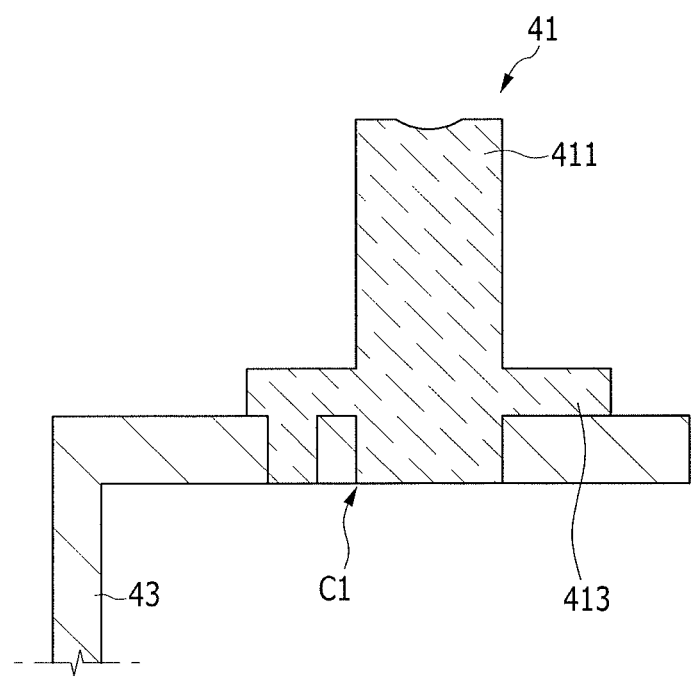
FIG. 4A illustrates a cross-sectional view of a negative terminal and a negative electrode lead tab after connection to each other, according to an embodiment of a method for manufacturing a rechargeable battery.

FIG. 4A illustrates a cross-sectional view of the negative terminal 41 connected to the negative electrode lead tab 43, according to a method for manufacturing a rechargeable battery according to embodiments. Referring to FIG. 4A, to connect the electrode terminal and the lead tab, the first connection part C1 may be formed by connecting the rivet part 411 of the negative terminal 41 and the bonding part 431 of the negative electrode lead tab 43 to each other, and then caulking the rivet part 411. The rivet part 411 and the bonding part 431 may be made of different materials. The flange 413 of the negative terminal 41 may maintain a contacted state with the bonding part 431 of the negative electrode lead tab 43 without welding.

Figure 4B:
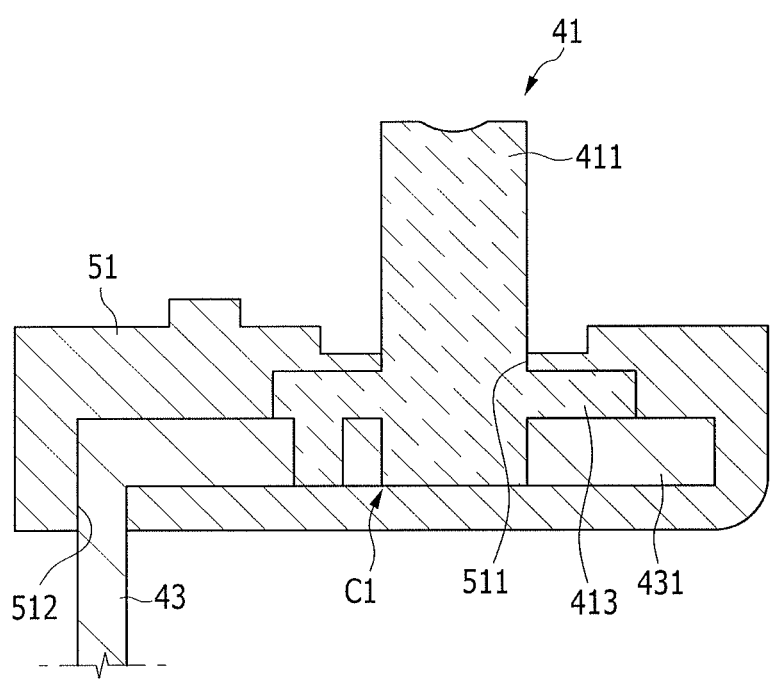
FIG. 4B illustrates a cross-sectional view of the connected negative terminal and negative electrode lead tab after insert injection-molding.
Figure 4C:
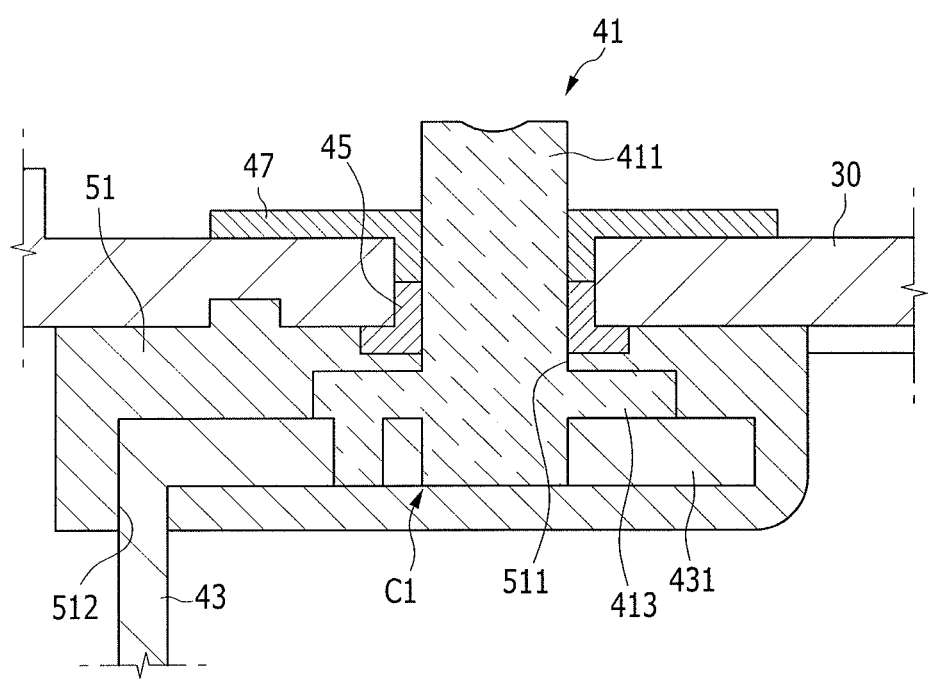
FIG. 4C illustrates a cross-sectional view of the insert injection-molded negative terminal after coupling with a cap plate.

FIG. 4B illustrates a cross-sectional view of the connected negative terminal 41 and the negative electrode lead tab 43 after insert injection-molding. Referring to FIG. 4B, during insert injection molding, the lower end of the rivet part 411, the flange 413, and the bonding part 431 may be embedded inside the negative insulator 51.

The negative insulator 51 may be molded outside, e.g., around, the first connection part C1 by insert injecting molding. For example, during insert injection molding, the negative insulator 51, within which the first connection part C1 may be embedded, may be molded by inserting the negative electrode lead tab 43 and the first connection part C1 of the negative terminal 41 into a mold and injecting an insulating material (e.g., PPS) into the mold.

During insert injection molding, the negative insulator 51 may be configured to include the first opening 511 through which the rivet part 411 of the negative terminal 41 may protrude and the second opening 512 through which the negative electrode lead tab 43 may protrude, in order to embed the first connection part C1 within the negative insulator 51. The first connection part C1 may be embedded within the negative insulator 51 to, thereby, maintain a firm connection state of the first connection part C1.

FIG. 4C illustrates a cross-sectional view of the insert injection-molded negative terminal 41 coupled with the cap plate 30. Referring to FIG. 4C, the negative terminal 41 protruding from the negative insulator 51 may be inserted into the terminal hole 311, and the gasket 45 may be inserted therebetween. For example, the rivet part 411 may be inserted into the terminal hole 311 and the gasket 45 may be inserted between the rivet part 411 and the negative insulator 51 within the first opening 511.

The terminal plate 412 may then be riveted to the outer end, e.g., exposed end, of the rivet part 411 by inserting the outer insulator 47 on the gasket 45 (see FIG. 2). The negative terminal 41 may be integrally formed, i.e., as a single one unit. As such, a manufacturing process of the negative terminal 41 may be simplified. In addition, the negative electrode lead tab 43 and the electrode terminal 41 may include different materials to facilitate electrically connecting the lead tab 43 and the negative terminal 41 to each other. The first connection part C1 may be embedded inside the negative insulator 51 by the insert injection molding, to prevent the first connection part C1 from contacting the electrolytic solution.

Hereinafter, a second exemplary embodiment will be described. The second exemplary may be similar to the first exemplary embodiment. As such, only features of the second exemplary embodiment which differ from the first exemplary embodiment will be described.

Figure 5:
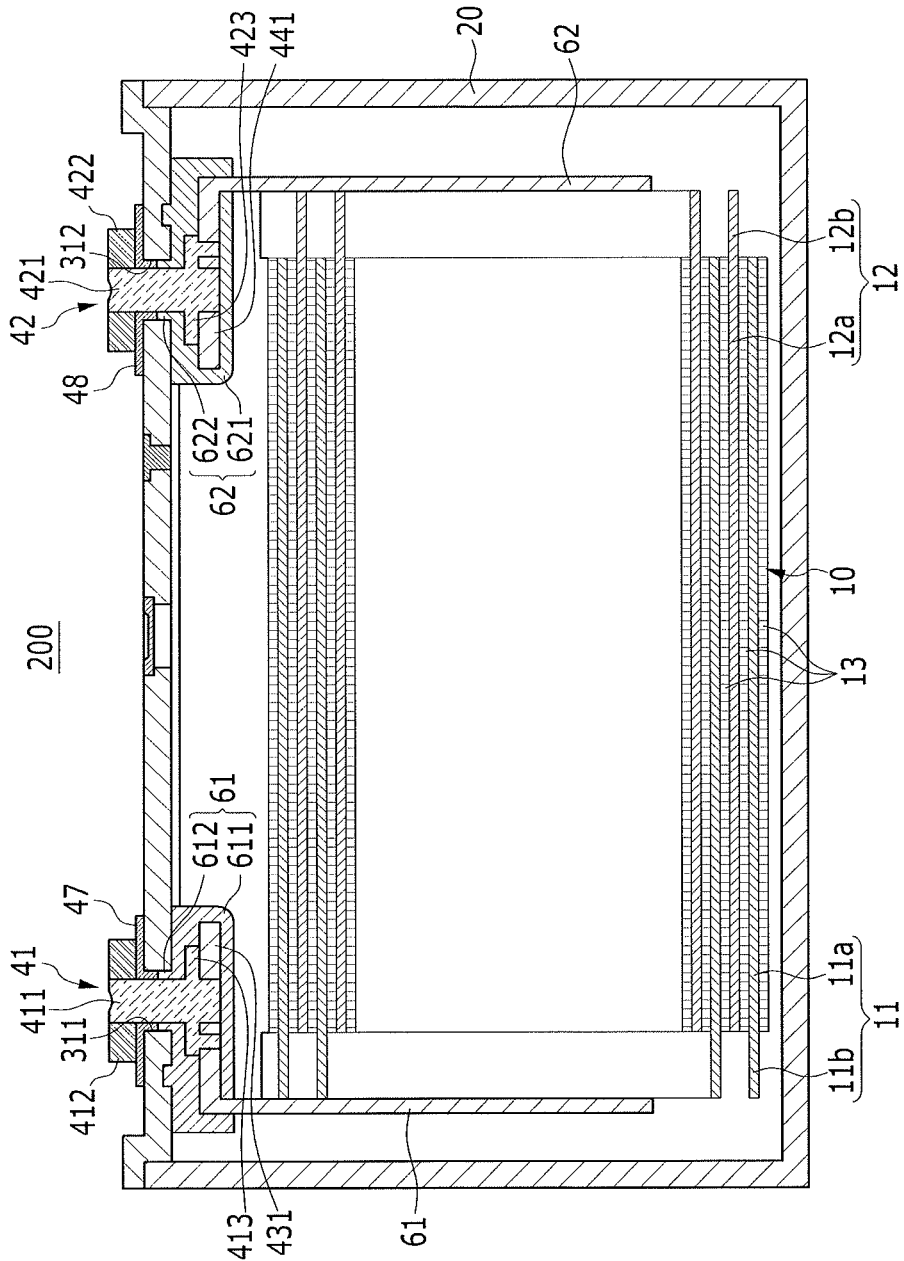
FIG. 5 illustrates a cross-sectional view of a rechargeable battery according to a second exemplary embodiment.

FIG. 5 illustrates a cross-sectional view of a rechargeable battery 200 according to the second exemplary embodiment. Referring to FIG. 5, in the rechargeable battery 200 of the second exemplary embodiment, negative and positive insulators 61 and 62 may each include embedding parts 611 and 621 and sealing parts 612 and 622.

The embedding parts 611 and 621 may be formed by embedding lower ends of rivet parts 411 and 421 of negative and positive terminals 41 and 42, flanges 413 and 423, and bonding parts 431 and 441, corresponding to and bonded to the lower ends of the rivets 411 and 421 and the flanges 413 and 423, thereby protecting the rivet parts 411 and 421 from an electrolytic solution. For example, the embedded parts 611 and 612 may extend under the lower end of the rivets 411 and 421.

The sealing parts 612 and 622 may protrude from the embedding parts 611 and 621 alongside the rivet parts 411 and 421 and through the terminal holes 311 and 312, to seal the spaces between the rivet parts 411 and 421 and the terminal holes 311 and 312. The sealing parts 612 and 622 may replace the gaskets 45 and 46 described above with reference to the first exemplary embodiment. As a result, assembly of the rechargeable battery 200 may be simpler than that of the first exemplary embodiment.

Outer insulators 47 and 48 may be inserted between the rivet parts 411 and 421 of the negative and positive terminals 41 and 42 and the terminal holes 311 and 312. The outer insulators 47 and 48 may extend to the sealing parts 612 and 622, to thereby seal the terminal holes 311 and 312, and supplement a sealing action of the sealing parts 612 and 622.

The rechargeable battery according to embodiments may simplify a structure of an electrode terminal and may protect the electrode terminal from an electrolytic solution. According to the exemplary embodiments, the electrode terminal and the connection part of the lead tab may be embedded in the insulator, thereby simplifying a structure of the electrode terminal and protecting the electrode terminal from an electrolytic solution. For example, the electrode terminal may not melt even when the electrode terminal contacts the electrolytic solution.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   an electrode assembly including electrodes on opposite sides of a separator;
   a case retaining the electrode assembly;
   a cap plate coupled with an opening of the case;
   electrode terminals extending through terminal holes of the cap plate;
   lead tabs connecting the electrode terminals to the electrode assembly, the electrode terminals being electrically connected to the lead tabs at connection parts; and
   insulators, the connection parts being embedded in the insulators.

2. The rechargeable battery as claimed in claim 1, wherein:
the electrode terminals and the lead tabs include different materials.

3. The rechargeable battery as claimed in claim 1, wherein:
the electrode terminal in the connection part includes aluminum, and
the lead tab in the connection part includes copper.

4. The rechargeable battery as claimed in claim 1, wherein each of the electrode terminals includes
a rivet part in a respective one of the terminal holes,
a terminal plate connected to an outer portion of the rivet part, the outer portion being outside the case,
a flange integrally formed with an inner portion of the rivet part, the inner portion being inside the case, and
each of the lead tabs includes
a bonding part coupled to the rivet part and the flange, the rivet part and the bonding part being different materials.

5. The rechargeable battery as claimed in claim 4, wherein caulk secures the rivet part and the bonding part together and a weld secures the flange and the bonding part together.

6. The rechargeable battery as claimed in claim 4, wherein:
the rivet part, the flange, and the bonding part connect at a respective one of the connection parts and are embedded in a respective one of the insulators.

7. The rechargeable battery as claimed in claim 1, wherein:
each of the insulators includes
a first opening through which a rivet part of a respective one of the electrode terminals protrudes and
a second opening through which a respective one of the lead tabs protrudes.

8. The rechargeable battery as claimed in claim 4, further comprising:
a gasket which is interposed between the rivet part of a respective one of the electrode terminals and a respective one of the terminal holes.

9. The rechargeable battery as claimed in claim 1, wherein:
the electrode terminals include aluminum,
the lead tabs include copper, and
the insulators include polyphenylene sulfide.

10. The rechargeable battery as claimed in claim 4, wherein:
each of the insulators includes:
an embedding part in which a lower end of the rivet part of a respective one of the electrode terminals, the flange, and the bonding part of a respective one of the lead tabs are embedded, and
a sealing part which protrudes from the embedding part, alongside the rivet part, and extends through a respective one of the terminal holes.

11. The rechargeable battery as claimed in claim 1, wherein the case and the cap plate include the same material.

12. A method for manufacturing a rechargeable battery, comprising:
connecting an electrode terminal and a lead tab to each other at a connection part, the electrode terminal and the lead tab being different materials;
performing insert injection molding to embed the connection part in an insulator;
electrically connecting the electrode terminal to the lead tab; and
coupling the electrode terminal with a terminal hole of a cap plate.

13. The method as claimed in claim 12, wherein connecting the electrode terminal and the lead tab includes caulking a rivet part of the electrode terminal and a bonding part of the lead tab.

14. The method as claimed in claim 12, wherein performing insert injection molding includes embedding a lower end of the rivet part of the electrode terminal, a flange, and a bonding part of the lead tab, corresponding in position to the lower end of the rivet part and the flange, inside the insulator.

15. The method as claimed in claim 12, wherein performing insert injection molding includes:
forming a first opening in the insulator for allowing the rivet part of the electrode terminal to protrude therethrough; and
forming a second opening in the insulator for allowing the lead tab to protrude therethrough.

16. The method as claimed in claim 12, wherein coupling the electrode terminal with the terminal hole includes:
coupling the electrode terminal protruding from the insulator with the terminal hole; and
inserting a gasket between the terminal hole and the electrode terminal.

* * * * *